(12) United States Patent
Johansson et al.

(10) Patent No.: US 10,171,763 B2
(45) Date of Patent: Jan. 1, 2019

(54) METHOD FOR FIXED PATTERN NOISE REDUCTION AND USE OF SUCH METHOD

(71) Applicant: Axis AB, Lund (SE)

(72) Inventors: Emanuel Johansson, Lund (SE); Jesper Bengtsson, Lund (SE); Thomas Winzell, Lund (SE)

(73) Assignee: Axis AB, Lund (SE)

( * ) Notice: Subject to any disclaimer, the term of this patent is extended or adjusted under 35 U.S.C. 154(b) by 0 days.

(21) Appl. No.: 15/868,362

(22) Filed: Jan. 11, 2018

(65) Prior Publication Data

US 2018/0205898 A1     Jul. 19, 2018

(30) Foreign Application Priority Data

Jan. 19, 2017    (EP) .................................... 17152224

(51) Int. Cl.
| | |
|---|---|
| H04N 5/217 | (2011.01) |
| H04N 5/365 | (2011.01) |
| H04N 5/378 | (2011.01) |
| G06K 9/62 | (2006.01) |
| G06T 5/00 | (2006.01) |

(52) U.S. Cl.
CPC .......... *H04N 5/365* (2013.01); *G06K 9/6202* (2013.01); *G06K 9/6215* (2013.01); *G06T 5/002* (2013.01); *H04N 5/378* (2013.01)

(58) Field of Classification Search
CPC ..................................................... H04N 5/365
USPC ....................................................... 348/241
See application file for complete search history.

(56) References Cited

U.S. PATENT DOCUMENTS

| | | | |
|---|---|---|---|
| 7,795,578 | B2 | 9/2010 | Hogasten et al. |
| 7,995,859 | B2 | 8/2011 | Hogasten |
| 8,488,010 | B2 | 7/2013 | Voss et al. |
| 8,503,821 | B2 | 8/2013 | Hogasten |
| 8,941,743 | B2 | 1/2015 | Petrescu et al. |
| 9,224,190 | B2 | 12/2015 | Moon et al. |
| 2009/0128636 | A1 | 5/2009 | Wakagi et al. |
| 2014/0078347 | A1* | 3/2014 | DeBattista ......... H04N 5/23229 348/241 |

(Continued)

OTHER PUBLICATIONS

Extended European Search Report issued in corresponding EP Application No. 17152224.6, dated Jun. 6, 2017, 7 pages.

(Continued)

*Primary Examiner* — Anthony J Daniels
(74) *Attorney, Agent, or Firm* — Snyder, Clark, Lesch & Chung, LLP (57) ABSTRACT

An apparatus is disclosed for structural fixed pattern noise reduction in a video stream. A method may include, for each target pixel in a first image frame, defining a first target pixel patch, and defining a first search area comprising the first target pixel patch; for each pixel in the first search area, comparing a first pixel patch around the pixel with the first target pixel patch, and using the pixel when calculating an average for the target pixel. The method may include, in a second image frame, localizing a second target pixel, and defining a second search area comprising the second target pixel; for each pixel in the second search area, comparing a second pixel patch around the pixel of the second search area with the first target pixel patch, and using the pixel in the second search area when calculating an average for the target pixel.

20 Claims, 3 Drawing Sheets

(56) References Cited

U.S. PATENT DOCUMENTS

| | | | |
|---|---|---|---|
| 2014/0118578 A1* | 5/2014 | Sasaki | G06T 5/20 |
| | | | 348/241 |
| 2015/0178899 A1 | 6/2015 | Ren et al. | |
| 2015/0332441 A1 | 11/2015 | Hogasten et al. | |
| 2017/0109867 A1* | 4/2017 | Milshteyn | G06T 5/002 |
| 2017/0372453 A1* | 12/2017 | Foster | G06T 7/246 |

OTHER PUBLICATIONS

Yu, Hui et al., "Non-local Means-based Nonuniformity Correction for Infrared Focal-Plane Array Detectors," International Symposium on Optoelectronic Technology and Application 2014: Image Processing and Pattern Recognition, vol. 9301, 2014, 9 pages.

Tendero, Y. et al., "ADMIRE: a locally adaptive single-image, non-uniformity correction and denoising algorithm: application to uncooled IR camera," Proc. SPIE 8353, May 31, 2012, 16 pages.

Shaham, Noam, et al., "Methods for the acceleration of 'non-local means' noise reduction algorithm," Pontifical Catholic University of Rio de Janeiro, Dec. 2007, 84 pages.

Berneryd, Lina, "Optimization of Non-Local Means Filtration for Cone Beam Computed Tomography," Chalmers University of Technology, Gothenburg, Sweden, 2015, 59 pages.

\* cited by examiner

METHOD FOR FIXED PATTERN NOISE REDUCTION AND USE OF SUCH METHOD

CROSS-REFERENCE TO RELATED APPLICATIONS

This application claims priority to European Patent Application No. 17152224.6, filed Jan. 19, 2017, which is incorporated herein by reference.

TECHNICAL FIELD

The present invention relates to the field of noise filtering, and in particular to noise filtering of video data, such as live video data.

TECHNICAL BACKGROUND

Noise is a factor to consider in any imaging situation, to a smaller or greater extent. For that reason the area is well researched and there are numerous techniques for noise reduction for most types of noise. Furthermore this makes it relevant to define the type of noise being the prime candidate for the invention according to the present application, namely various types of Fixed Pattern Noise (FPN) to be further specified in the Detailed Description. The invention will be described and explained in the context of readout noise, yet other types of Fixed Pattern Noise would also be suppressed. The present invention is particularly useful in connection with FPN being generated during readout, FPN that varies slowly over time, and FPN having a regionally clustered appearance such that it comprises edges. This will be explained further in the detailed description. Furthermore, the invention is particularly well-suited for thermal cameras using microbolometers, partially due to their specific properties in terms of various types of noise and since the signal-to-noise level may often be low.

SUMMARY

The present invention relates to a method for eliminating or alleviating structural fixed pattern noise in a video stream. The description that follows makes use of established terminology, yet to improve the reading experience for a reader not fully familiar with the technical field, a short description of some key terminology is added:

Image frame—An image frame in a stream of images making up a video stream. The image frame consists of pixelized information describing color and intensity of an imaged object. Typically the image frame may be seen as a rectangular pixel matrix. In a schematic illustration the image frame will come from a raw camera stream having its origin at the image sensor of the camera, enter a number of processing stages, after which it will be forwarded in a display stream, encoded, and transmitted to a remote server.

First image frame—The current image frame being processed.

Second image frame—Generally a previous image frame, that may already have been processed. Data is collected from this frame to improve statistics. If there has been a relative movement between the first and the second image frame, e.g. that the camera has moved slightly, such that the imaged scene has shifted position (ever so slightly) on an image sensor. Since the second image frame is an image frame that has already been processed it will in turn comprise information from a previous frame, and so on.

Target pixel—One of the pixels in an image frame. More specifically the pixel that is currently being processed. As the method proceeds all pixels in the pixel matrix (image frame) may have been the target pixel (in embodiments where the entire image frame is processed).

Pixel patch—A small area of pixels including (and often surrounding) the pixel in question. The pixel patch may be a pixel matrix of 3×3 pixels, where the pixel in question is the center pixel. The pixel patch is used when trying to quantify similarity between different pixels by including a small portion of their surroundings.

Target pixel patch—The pixel patch including the target pixel.

Search area—An area of pixels within an image frame including a target pixel. Usually a rectangular area having dimensions larger than the pixel patch. When performing an averaging procedure including comparing all possible pixel patches with the pixel patch including the target pixel this is performed in the search area. The size of the search area could theoretically correspond to the entire image frame, yet since there is a trade off including processing speed it usually has a size being smaller, often considerably smaller, than the image frame. It could be as small as 5×5 pixels, or 4×4 pixels, yet it may also be considerably larger.

Camera directional data—information concerning how the camera (or sensor) is directed. May be acquired continuously so that each image frame is associated with directional data. The directional data enables electronic image stabilization, among other things. Directional data may be estimated based on the settings of a pan/tilt motor, yet for the purposes of the present invention where the motion to be detected is more related to unwanted shake or vibration the directional data is preferably acquired using an accelerator or a gyroscope. There are several different sensors available for this purpose, such as MEMS gyroscopes, which could be a 3-axis MEMS gyroscope and a 3-axis MEMS accelerometer.

Further to the above, the inventive method comprises, defining a pixel to be processed in a first image frame as a target pixel. For each target pixel, a first target pixel patch including the target pixel is defined. Furthermore, a search area is defined, the area including the first target pixel patch. For each pixel in the first pixel area a first pixel patch around the pixel is compared to the first target pixel patch, and the pixel is used for calculating an average for the target pixel if the similarity of the pixel patch and the first target pixel patch is within a first threshold. Following this first part of the method a second image frame is used for the purpose of improving statistics for the average of the target pixel; in a second image frame localizing a second target pixel, and defining a second pixel search area comprising the second target pixel. For each pixel in the second search area a second pixel patch around the pixel of the second search area is compared to the first target pixel patch. If the similarity of the second pixel patch and the first target pixel patch is within a second threshold, the pixel of the second search area is used when calculating an average of the first target pixel. For the purposes of the present invention the first image frame and the second image frame are separate image frames in the videostream, and the location of the second target pixel is estimated from the location of the target pixel of the first image frame, combined with camera directional data. The method is performed on each pixel of the first image frame, or of a smaller selection of pixels.

The method of the present invention accomplishes several beneficial effects, and ultimately reduces the impact of structural fixed pattern noise. The first part of the method, where only information from the first image frame is used, what is accomplished is a method similar to non-local means filtering, a spatial average having a feature of preserving edges. For a single image frame also the edges of structural fixed pattern noise would be preserved. In the present invention, as information comprised in a second image frame and information of camera directional data between the images is added, the effects of structural fixed pattern noise will be reduced as well. Using the camera directional data makes it possible to match the position of the part of the scene depicted by the first target pixel in the first image frame to where this part of the scene would be positioned in the second image frame. Furthermore, the features of the inventive process results in that localizing the second target pixel exactly, down to a single pixel precision, will not be critical. Utilizing the information from the second image frame adds a temporal parameter, and since the structural pattern noise (or the position thereof in the image frame) may shift in relation to a camera movement, the edges caused by this noise will be reduced while the edges emanating from true objects in the imaged scene will still be preserved. Notably, any and every pixel of the first image frame may be defined as a target pixel, and in the general application every pixel will be. There will however still be embodiments where a smaller selection of pixels are defined as a target pixel.

In one or more embodiments the first image frame is subsequent to the second image frame, meaning that use is made of historical data when processing a present image frame. This way of processing image frames is suitable for a video stream where there is a continuous output of image frames. In other embodiments the order could be more freely selected.

In one or several embodiments the first search area may comprise a subset of the full size of the frame. The size of the first search area is a tradeoff between statistics and processing time. Using the full image frame may not be possible if a continuous stream of image frames is to be presented without too much temporal lag, which is one reason for using a subset of the full image frame.

The size of the second search area is smaller or equal to the size of the first search area. For the sake of simplicity the size of the second search area, i.e. the search area in the second image frame, may have a size equaling the size of the first search area. If a reduced processing time is desired the size of the second search area may be smaller than the first search area. Given that the direction data ensures that the pixel corresponding to the target pixel will be included in the second search area this reduction in size will not affect reliability to any significant degree.

In any embodiment the second threshold may differ from the first threshold, and as an example the second threshold may be set dynamically following the evaluation of each pixel in the second search area, thus enabling a more elaborate averaging process. For instance, after processing of the first search area there will be data concerning how many pixels were used for calculating the average of the target pixel, and consequently a corresponding amount may be expected from the second search area (in the embodiments where the first search area and the second search area are of equal size, otherwise a scale factor could be applied).

In one or more embodiments a weighted average is used when using the pixel of the second search area for calculating the average of the target pixel. Weights may be applied to enhance the effect of the temporal average, giving the data collected from previous image frames a greater weight. This may be used to give further advantages in embodiments where data from more than one previous image frame is used, which is an effect from using a feed-back loop where an output image frame is used as "second image frame" when processing a "first image frame" (i.e. a previous output image frame is used when processing a current image frame).

In related embodiments the weights may, for the second image frame, vary with distance from the second target pixel, in particular a greater weight may be given to pixel values closer to the second target pixel. By using the directional data to find the second target pixel makes it likely that this second target pixel is found at, near or close to the location in the second image frame of the true pixel corresponding to the first target pixel, and this may be mirrored by giving pixels closer to the second target pixel a higher importance.

When comparing the similarity between pixel patches a method such as sum of absolute differences (SAD) or sum of squared differences (SSD), yet other approaches may be used as well.

A pixel patch such as the first pixel patch and the second pixel patch may include a central pixel and surrounding neighboring pixels. A typical size of the pixel patch would be 3×3 pixels or 4×4 pixels, yet other sizes are possible as well, such as 2×2 pixels, 5×5 pixels etc.

The second image frame may, in one or several embodiments, comprise a weighted average of a stack of image frames calculated using the method according to any preceding claim. Use of data from several previous image frames will improve the effects of the noise filtering.

As briefly mentioned a feed-back function may be used, wherein the second image frame comprises the previous image frame output from the inventive method. The temporal effect of this feed-back loop may be said to be determined by the weights applied when calculating the average.

In order to simplify the processing the size of every pixel patch may be identical.

As will be further explained in the detailed description the method may have advantages in connection with electronic image stabilization, and consequently the method may preferably be activated as electronic image stabilization is activated.

According to a second aspect the present invention relates to the use of a method as disclosed in the present application, and such use may be triggered by the initiation or activation of an electronic image stabilization.

A further scope of applicability of the present invention will become apparent from the detailed description given below. However, it should be understood that the detailed description and specific examples, while indicating preferred embodiments of the invention, are given by way of illustration only, since various changes and modifications within the scope of the invention will become apparent to those skilled in the art from this detailed description. Hence, it is to be understood that this invention is not limited to the particular component parts of the device described or steps of the methods described as such device and method may vary. It is also to be understood that the terminology used herein is for purpose of describing particular embodiments only, and is not intended to be limiting. It must be noted that, as used in the specification and the appended claim, the articles "a," "an," "the," and "said" are intended to mean that there are one or more of the elements unless the context clearly dictates otherwise. Thus, for example, reference to "a sensor" or "the sensor" may include several sensors, and the like. Furthermore, the word "comprising" does not exclude other elements or steps.

DETAILED DESCRIPTION OF EMBODIMENTS

In order to facilitate a deeper understanding of the present invention and its particular context some embodiments thereof will be disclosed.

Figure 1:
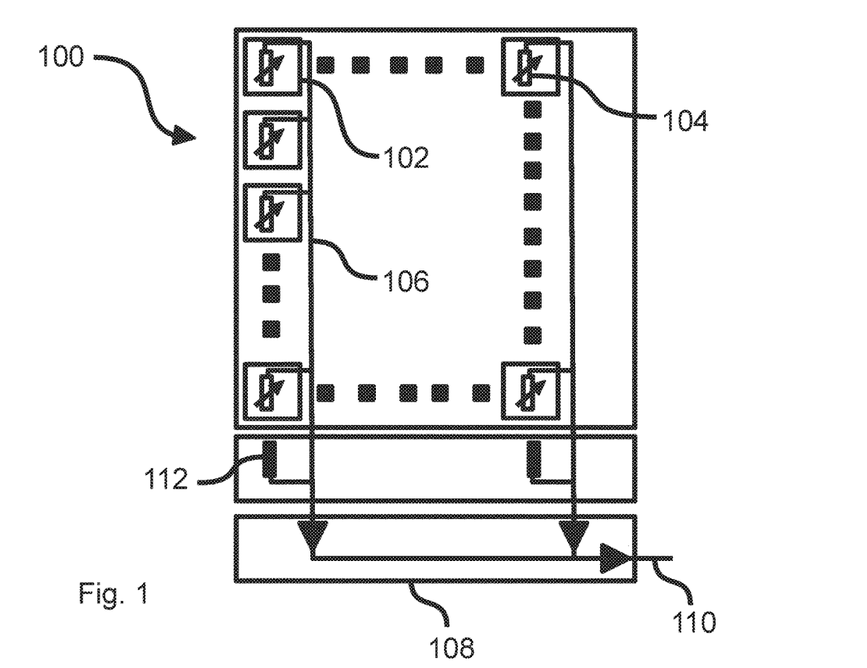
FIG. 1 is an illustrative schematic view of a chip of a thermal camera.

FIG. 1 illustrates a LWIR (Long Wavelength Infra Red) sensor 100, typically detecting wavelengths of about 8-14 micrometer, or at least a schematic plan view thereof. The description is analogous to the description of basically any multipixel sensor, and the present invention may be generalized beyond the particular embodiments disclosed. In FIG. 1 it is illustrated how each pixel 102 of the sensor has a resistive bolometer arrangement 104. The arrangement comprises an IR radiation absorber and a thermoelement and a circuitry 108 for readout. In general terms the sensor measures a temperature rise caused by IR radiation absorption, and the thermoelement converts the temperature of the absorber to an electrical signal. A resistive bolometer is a sensor having the characteristics that its resistance varies with temperature. To enable somewhat reliable measurements the sensor is operated under vacuum.

Each pixel 102 is in turn electrically connected to a readout circuit 108 responsible for reading the signal from each pixel row, and now we are closing in on one of the problems for which the present invention intends to form a solution.

The pixels 102 are arranged in rows and columns, thus forming the full LWIR sensor, and while some sensors use a global readout the conventional solution for readout is what is referred to as a rolling shutter. In a rolling shutter the sensor is read out row by row to a readout circuit 108, and subsequently the contents of each readout circuit 110 is multiplexed and forwarded as a complete dataset corresponding to the entire image The readout circuit 108 for each row comprises a compensation bolometer 112, or a compensation pixel. The compensation bolometer 112 is a bolometer that preferably should not receive any radiation originating from the scene. As such the compensation bolometer provides a possibility for correction in relation to changes in response caused by factors not related to the scene as such, and it may then enable correction of the output from each bolometer 104 in the corresponding column. The response of the compensation bolometer 112 may be fully dictated by the temperature of a substrate on which it is arranged, and consequently examples of such factors could be drift in the electronics resulting in inaccurate readout levels, caused by variations in internal temperature, etc. When a corresponding technique, i.e. "dark pixel compensation" or "dark current compensation", is used for regular cameras operating in the visual field this compensation pixel will have a reasonably good effect, since it is readily achievable to prevent light from reaching the compensation pixel. For a compensation bolometer measuring IR radiation or thermal radiation creation of a "dark" environment is significantly more difficult, since the analogy to total darkness would be a temperature of 0 K. Still, the compensation bolometer will, as mentioned, account for preventions of some artifacts successfully. Electronics in a readout circuit of a thermal camera are highly sensitive to be able to handle the often low signal to noise level and also each individual readout circuit will have a response that varies over time. This together causes the fixed pattern noise which gives the image a striped appearance, which may referred to as column fixed pattern noise (CFPN). The effect for a particular column may vary over time, due to temperature drift, aging, etc. The response over the sensor circuit area may also vary due to artifacts generated during the manufacturing process. These artifacts may appear as areas of the sensor having a response differing from neighboring areas, and the effect may be a fixed pattern noise that is well-suited for reduction using the present invention. Defects, such as scratches or dust, on any of the lenses in the lens system may cause artifacts on certain areas of the sensor image being another cause of noise where the invention may be applicable. The variation over time of these artifacts is slow compared to a frame rate in a video recording, and for adjacent frames in a video sequence the noise may be considered as fixed in deed.

The variation over time complicates the noise reduction, since it reduces the possibility of eliminating the effects of the noise by means of calibration. Column fixed pattern noise is one example, and the corresponding effect on rows is another. Another example is when the manufacturing process results in regions or patches of bolometers with slightly different performance than neighboring regions. Some such effects may be adjusted in the calibration procedure, but not all, and similar to the column fixed pattern noise, these effects may have a variation in their appearance.

The present invention aims at eliminating or at least alleviating the visual effects of this type of fixed pattern noise in a video stream. The specific type of fixed pattern noise will be referred to as structural fixed pattern noise in the following, and it is characterized in that an area of the sensor (larger than a single pixel, preferably larger than 3 pixels in at least one direction, and even more preferably even larger) has a deviating response. Apart from the specific example of column fixed pattern noise, and row fixed pattern noise, the present invention may consequently also have a beneficial effect on other types of fixed pattern noise resulting in a regional variation in response, see e.g. the examples above. The inventive technique will have a suppressing effect on noise of the above type, wherein the noise appears as a uniform effect on a cluster of pixels. The size of such cluster will be discussed further.

The in the present situation the challenge is to remove the noise while preserving features, and in particular edges originating from the scene. Removing the visual effect of noise may be accomplished by blurring the image, or with other brute force noise reduction, but the challenge of maintaining edges defining objects in an image, while at the same time removing noise having edges from the image is considerably more challenging. Furthermore, this should preferably be performed in a live stream of image frames from a camera.

A thermal image often contains large areas with low signal, and an associated low signal to noise ration. This makes the fixed pattern noise more problematic or prominent in thermal imaging as compared to regular imaging in the visual field, and the fixed pattern noise will then be particularly obvious. For video imaging a further effect will make things worse, namely the effect of planned or inadvertent movement of the camera, causing a smaller or greater shift of the view. If the camera is perfectly stationary the effect for an operator observing the scene via a monitor would be stationary vertical stripes formed on the screen, and the stripes could be barely visible. When there is a movement of the camera these stripes may be more visible. The stripes are stationary in relation to the image sensor, which means that they will sweep over objects in the imaged scene as the camera moves, and a human eye will react on this perceived motion. The effect will be even stronger if an electronic image stabilization is used. In this situation the camera will move, e.g. due to jitter and vibration, and the electronic image stabilization will force the imaged scene back to a stationary position in the view. At the same time as a result of the image stabilization the stripes caused by column/row fixed pattern noise will sweep back and forth over the imaged scene, making them still more apparent and even disturbing and distracting. The same effect will result from other types of structural fixed pattern noise.

It should be noted that depending on the readout fashion different patterns may appear, and the invention as disclosed in the claims should not be limited in this aspect, unless clearly stated. For example, the sensor could have a readout based on columns rather than rows, resulting in an analogue noise also efficiently handled by the present invention.

According to the present invention directional data representing camera movement information is correlated to a stream of images from a video camera. The directional data is preferably acquired from a gyroscope or accelerometer of the video camera. The sensor acquiring the directional data may be located in connection to the sensor chip, or at other locations in the mechanical construction. The directional data is used when performing image processing, and as will be evident from the following a further result will be that the directional data in combination with other characteristics of the invention will have the effect that structural fixed pattern noise may be eliminated or at least reduced.

In a method according to a first embodiment of the present invention two image frames and their associated directional data is acquired. Starting from a particular pixel in the first image frame, a target pixel 116, (see arrow in FIG. 2A) a noise reduction process is initiated. A target pixel patch 118 is defined around the target pixel 116, e.g., a 3 by 3 matrix with the target pixel in the middle, and a first search area 120 (see dotted rectangle in FIG. 2A) is defined around the target pixel patch 120. In the present embodiment column fixed pattern noise is used as an example, since it is a good example of noise that could be successfully reduced with the present invention, and since it is readily illustrated in the drawings. Similar embodiments could be described in relation to the other types of fixed pattern noise described, and the present invention as defined by the appended claims should not be limited by this disclosure, unless clearly stated.

Figure 2A:
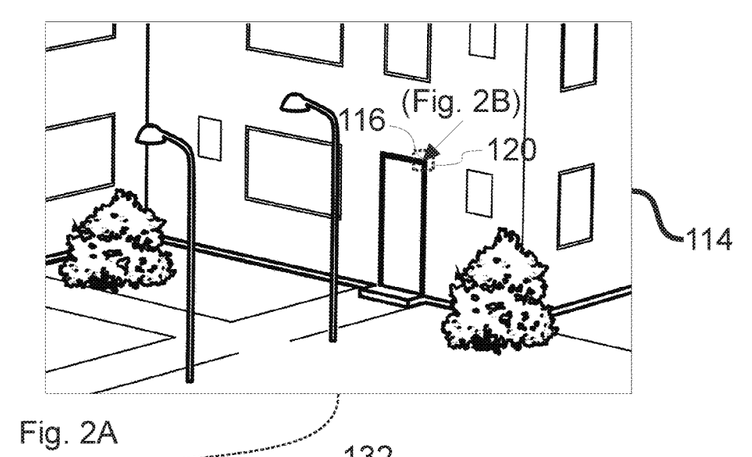
FIG. 2A is an illustration of a first image frame in a video stream.
Figure 2B:
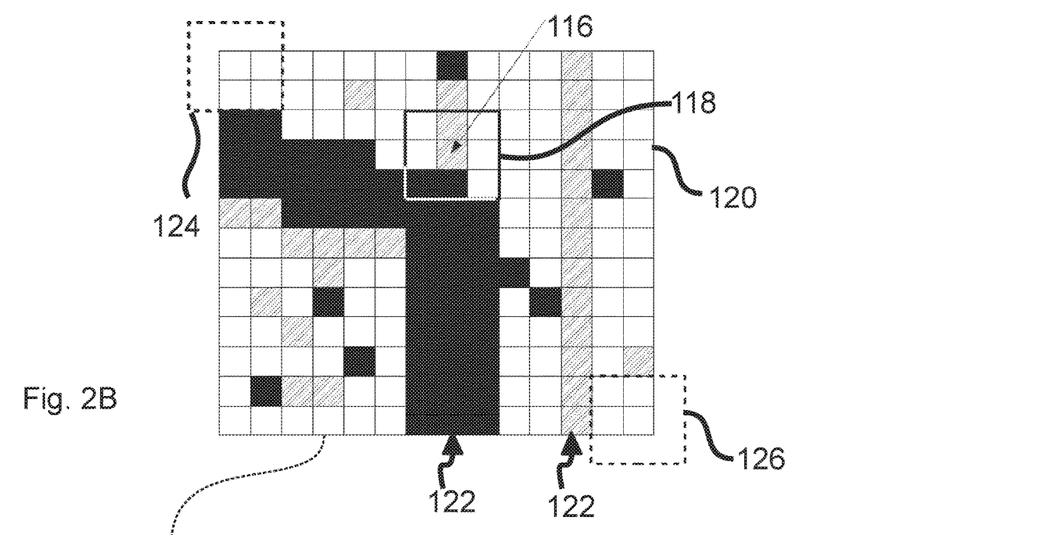
FIG. 2B is a partial magnification of the view of FIG. 2A

FIG. 2B is a partial magnification of FIG. 2A, illustrating the first search area 120, the target pixel patch 118 and the target pixel 116. The type of fill for each cell, or pixel, indicates the signal level from that particular pixel, and for the sake of simplicity and clarity only three levels are used; white (high), hatched (medium), and black (low). The hatched columns 122 illustrate an effect of column fixed pattern noise, CFPN, biasing the signal level in one direction or the other. Some random pixel noise is also visible in the drawing, and this type of noise will not be addressed by using the present invention.

Instead of using the value for the target pixel 116 directly, a process for calculating a non-local mean is performed. For each pixel in the first search area 120 a first pixel patch is defined. This first pixel patch is compared to the target pixel patch 118 and if the pixel patches are considered similar enough the value of the pixel is used when calculating an average pixel value for the target pixel. This is performed for each pixel in the search area, as indicated by the pixel patch 124 in the upper left, and the pixel patch 126 in the lower right (indicated by dotted lines). Similarity between pixel patches may be calculated in several ways, including sum of absolute differences (SAD), sum of squared differences (SDS) etc. A first threshold may be used to quantify what is considered to be "similar enough". The effect will be that only pixels located in a similar-looking area will be used when calculating a mean value, resulting in that the spatial resolution may be maintained to a high degree, and therefore the effects of CFPN will not be reduced in any significant way. Basically, the process will not be able to distinguish between the effects of CFPN and an actual edge in the image. It may be noted that the pixel patches as indicated by the dotted squares partly extend beyond the borders of the search area, resulting in that some of the pixels are empty. This is purely an effect of how the search area is defined, and it may be handled in different ways. One way is to simply use the pixel values for the "empty" pixels. Another way would be to ignore the pixels or to add zeroes in place of the "empty" pixels. It could also be handled by ensuring that the pixel patch never extends beyond the borders of the search area, i.e. for the embodiment disclosed in the drawings it would correspond to moving the first pixel patch one pixel to the right and one pixel down, and to perform the same adjustment on the last pixel patch.

In the illustrated embodiment the size of the patch is 3×3 pixels, yet the size may differ. The size of the patch may have a correlation with the dimensions of the noise to be reduced. It is preferred that the size of the structure caused by the noise is of approximately equal size or larger than the patch in at least one and the same dimension.

Figure 3A:
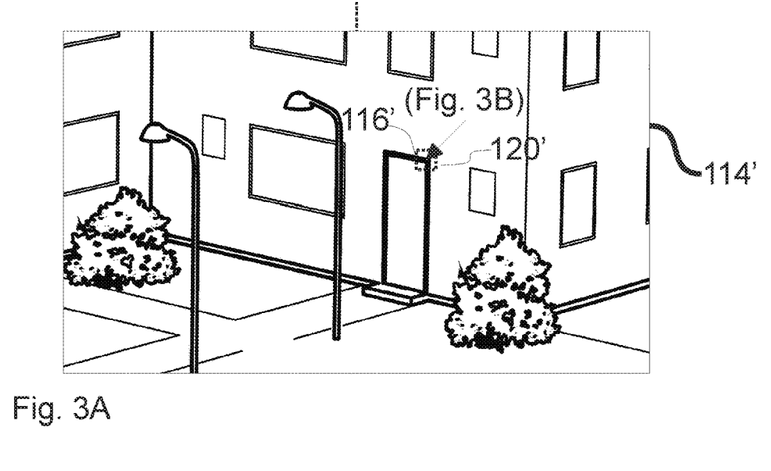
FIG. 3A is an illustration of a second image frame in a video stream.
Figure 3B:
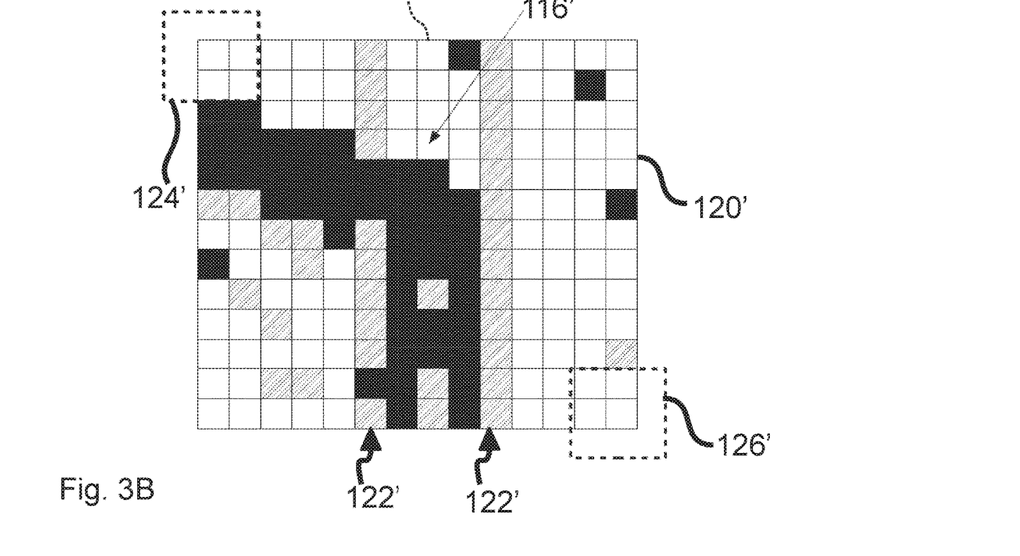
FIG. 3B is a partial magnification of the view of FIG. 3A

In the next step however information from a previous image frame 114' is used. A previous image frame 114' is illustrated in FIG. 3A and its partial magnification shown in FIG. 3B. The numbering is identical to the one used for the first image frame, yet a prime sign has been added to the reference numeral for like components of the previous (or "second") image frame 114'. There is an ever so slight positional shift between the view of FIGS. 2A and 3A, but by using directional data an approximate position of the target pixel 116 in the second image frame, referred to as a second target pixel 116', may be deduced. The position is indicated by the arrow in FIG. 3B. By defining a second pixel patch and a second search area 120' in the previous view it is possible to assume that a pixel corresponding to the target pixel will be present in the second search area, most likely close to the second target pixel 116'. For each pixel in the second search area 120' an averaging process similar to the one already described is performed. However, the second pixel patch (such as e.g. 124') will also be compared to the target pixel patch 118 in the first image frame, and based on the outcome of the comparison the second pixel (the central pixel in each second pixel patch) will be used for calculating an average for the target pixel 116.

When looking at the drawings it is possible to get the impression that there are numerous patches that would be similar to each and every target pixel patch. In a practical scenario, however, generally the effect of the noise is much less pronounced compared to the actual image information, resulting in that the effect of the process actually will be a reduction of the effects caused by fixed pattern noise rather than a maintenance of the same. This effect is of course further supported by the use of directional data since positions in a first image frame may be correlated to positions in another image frame or set of image frames.

Figure 4A:
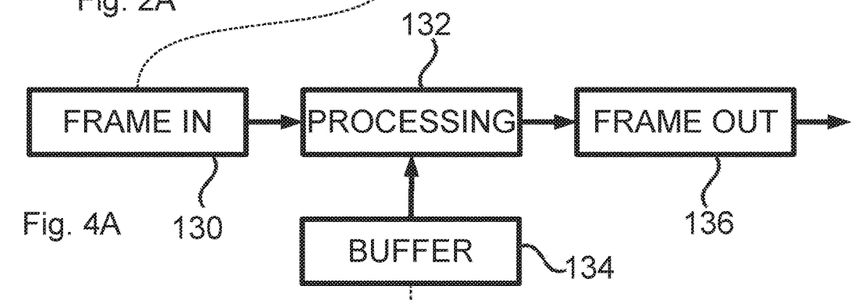
FIG. 4A is a flowchart illustrating how the information of FIGS. 2A and 3A is used.
Figure 4B:
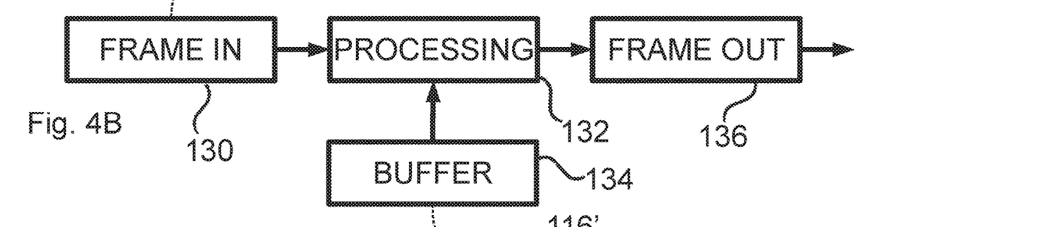
FIG. 4B is a flowchart illustrating how the information of FIGS. 2B and 3B is used.

Typically the above process is performed for each pixel in the first image frame, i.e. each pixel in the first image frame is in turn acting target pixel, and it is thus repeated until every pixel in the first image frame has been filtered (corrected/adjusted). The resulting filtered image frame, now containing current image information blended in with information from a previous image frame, is forwarded in the image stream. This is illustrated in FIGS. 4A and 4B, where the first image frame 130 is processed in step 132 with second image frame collected from a buffer 134. The filtered frame has been spatially filtered, without reduction in resolution, and temporally filtered. The process thus enables a reduction of the effects of column based fixed pattern noise. The resulting frame is then forwarded to step 136 as it leaves the process.

The explanation of this enablement is more readily described under the assumption that the position of the fixed pattern noise has shifted in relation to imaged objects between the first and the second (the previous) image frame, which is a reasonable assumption to make since even a very small shift in camera direction is sufficient to shift the imaged scene a pixel on the image sensor.

Merely using the previous image frame will increase the statistical reliability of the average. Furthermore, the information acquired from the calculation of the first image frame may be used for the second image frame, which results in a set of embodiments. Such information may include how many pixel patches that were considered similar enough to the target pixel patch to be included in the average. According to one embodiment one may assume that since we are looking essentially at the same area in the second image frame as in the first image frame, the number of pixel patches in the second search area being similar enough to the target pixel patch should be the corresponding number of the first search area. The second threshold could then be set to achieve that effect, i.e. to harmonize the number of "sufficiently similar" pixel patches in the first and second search area respectively. Should the target pixel be affected by a column fixed pattern noise the effect will thus be reduced.

Furthermore, since we will have a reasonably good position of the target pixel in the second search area it will be possible to make better use of that information by giving the pixel patches in the second search area closer to the position of the target pixel patch a greater weight in the averaging process. In a second embodiment therefore, pixel patches in the second search area closer to the estimated position of the target pixel patch will have a greater weight than pixel patches further away. Though it may be, the reduction is not necessarily linearly dependent on distance.

A version of this latter approach would be to reduce the size of the second search area as compared to the first search area (equivalent to setting the weights beyond a particular distance from the position of the target pixel to zero). Pushing these approaches to the extreme would correspond to setting the size of the second search area to the size of a pixel patch around the second target pixel, and to force the target pixel value to the weighted average of the target pixel and the second target pixel. At the present time this extreme may not be desirable, but the effects of the present invention may be more readily understood by such an extreme embodiment.

Figure 5:
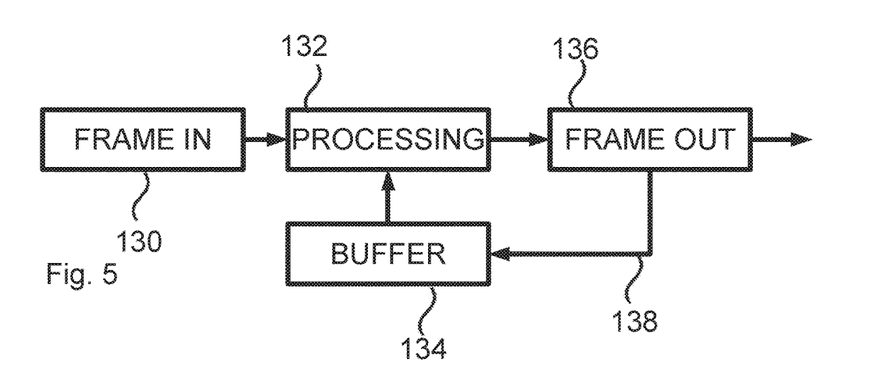
FIG. 5 is a flowchart of the method illustrated in the flowchart of FIGS. 4A and 4B, but of an alternative embodiment.

While the embodiment of FIG. 4A, 4B only utilized information of one previous image frame the embodiment may be readily adjusted to incorporate more image information. The adjustment is presented in the embodiment of FIG. 5. Instead of using information from the previous image frame only (uncorrected), use is made of information from the previously corrected image frame, as shown by arrow 138. By doing so, it is readily appreciated that the repetitive process will result in that information from all previous frames in included as well. The effect will be diluted with distance (measured in number of frames) from a current image frame, since a weight is involved when combining the information as an average. Adjusting the weight will thus affect a "memory" of the image information, and the inertia of the method. Typically, the weight will be such that current image frame (the "first image frame") is given less weight, so as to enable efficient removal of fixed pattern noise. In a typical embodiment the current frame would be given a very low weight, such as $\frac{1}{100}$-$\frac{1}{10}$, e.g. around $\frac{1}{20}$. The actual weight will obviously depend on the present situation, how fast the structural fixed pattern noise varies for the individual sensor etc.

Consider a situation where the inventive noise reduction is initiated in an existing stream. In such a situation there will be no historical information, and a current frame is only compared with a previous frame to begin with. The next frame will however have the information from two previous frames to its disposal, and so forth. When observing the actual output from such an initiation the effects are clearly visible in that a fixed pattern noise is gradually reduced, and after a few seconds it has disappeared.

The disclosed method will have a particular advantage in situations where a camera is moving in relation to the scene. The reason is that the fixed pattern noise in question will be static in relation to the image sensor while the imaged scene will move in relation to the image sensor, thus making the averaging process more efficient.

In situations where the camera moves (vibrates, shakes) in relation to the scene AND when electronic image stabilization is used the effects of the inventive method, according to embodiments thereof, will be even more apparent. Electronic image stabilization has the purpose of keeping static objects static in a view. The effect will be that fixed pattern noise will drift over the view since it will be fixed in relation to a physical image sensor pixel. The effect may be that features, such as structural fix pattern noise, more or less invisible to the naked eye when stationary now when moving in the view becomes more pronounced, enhanced by the human instinct of reacting to movement. Application of the present invention will greatly reduce the effect. The effect of the fixed pattern noise is clearly visible in an image stream, but to disclose a series of frames as drawings in the present application is not considered possible, as the technical constraints regarding color and dynamic range would make it too difficult for a reader to actually notice any effect at all.

In a situation where the camera is still, i.e. the imaged scene is static in relation to the image sensor, and consequently to the fixed pattern noise, the present method would neither improve the image, nor harm it.

The invention claimed is:
1. A method for structural fixed pattern noise reduction in a video stream comprises:
defining a pixel to be processed in a first image frame as a target pixel;
for each target pixel in the first image frame,
defining a first target pixel patch including the target pixel,
defining a first search area comprising the first target pixel patch, and
for each pixel in the first search area,
comparing a first pixel patch around the pixel in the first search area with the first target pixel patch, and
using the pixel in the first search area when calculating an average for the target pixel if similarity between the first pixel patch and the first target pixel patch is within a first threshold;
in a second image frame,
localizing a second target pixel,
defining a second search area comprising the second target pixel, and
for each pixel in the second search area,
comparing a second pixel patch around the pixel in the second search area with the first target pixel patch, and
using the pixel in the second search area when calculating the average for the target pixel if similarity between the second pixel patch and the first target pixel patch is within a second threshold; and
correcting the first image frame based on a value indicative of the average for the target pixel;
wherein the first image frame and the second image frame are separate image frames in the video stream, and
wherein the step of localizing a second target pixel comprises estimating a location of the second target pixel using a location of the target pixel and camera directional data.

2. The method of claim 1, wherein the first image frame is subsequent to the second image frame.

3. The method of claim 1, wherein the first search area comprises a subset of the first image frame.

4. The method of claim 1, wherein a size of the second search area is smaller than or equal to a size of the first search area.

5. The method of claim 1, wherein the second threshold differs from the first threshold.

6. The method of claim 1, wherein the second threshold is set dynamically.

7. The method of claim 1, wherein the second threshold is set dynamically following an evaluation of each pixel in the second search area, to adapt to a number of pixels selected for averaging in the first image frame.

8. The method of claim 1, wherein the step of using the pixel in the second search area when calculating the average of the first target pixel comprises using a weighted average.

9. The method of claim 8, wherein, for the second image frame, pixels closer to the second target pixel are given a greater weight.

10. The method of claim 1, wherein the first pixel patch and the second pixel patch each include a central pixel and surrounding neighboring pixels.

11. The method of claim 1, wherein the second image frame comprises a weighted average of a stack of image frames calculated using the method.

12. The method of claim 1, wherein the second image frame comprises an image frame preceding the first image and subject to the method.

13. The method of claim 1, wherein the number of pixels in the first target pixel patch, the number of pixels in the first pixel patch, and the number of pixels in the second pixel patch are the same.

14. The method of claim 1, wherein the method is performed when electronic image stabilization functionality is activated.

15. A video camera comprising:
an image sensor to capture images;
a memory to store the captured images as a video stream, wherein the video stream includes a first image frame and a second image frame, the first image frame and the second image frame being separate image frames in the video stream; and
a processor to define a pixel to be processed in the first image frame as a target pixel, wherein, for each target pixel in the first image frame, the processor is configured to:
define a first target pixel patch including the target pixel, and
define a first search area comprising the first target pixel patch, wherein, for each pixel in the first search area, the processor is configured to:
compare a first pixel patch around the pixel in the first search area with the first target pixel patch, and
use the pixel in the first search area when calculating an average for the target pixel if similarity between the first pixel patch and the first target pixel patch is within a first threshold,
wherein, in the second image frame, the processor is configured to:
localize the second target pixel, and
define a second search area comprising the second target pixel, wherein, for each pixel in the second search area, the processor is configured to:
compare a second pixel patch around the pixel in the second search area with the first target pixel patch, and
use the pixel in the second search area when calculating the average for the target pixel if similarity between the second pixel patch and the first target pixel patch is within a second threshold,
wherein the processor is configured to correct the first image frame based on a value indicative of the average for the target pixel, and
wherein the processor is configured to localize the second target pixel by estimating a location of the second target pixel using a location of the target pixel and camera directional data.

16. The video camera of claim 15,
wherein the first image frame is subsequent to the second image frame; or
wherein the first search area comprises a subset of the first image frame; or
wherein a size of the second search area is smaller than or equal to a size of the first search area.

17. The video camera of claim 15,
wherein the second threshold differs from the first threshold, or wherein the second threshold is set dynamically following an evaluation of each pixel in the second search area, to adapt to a number of pixels selected for averaging in the first image frame.

18. The video camera of claim 15, wherein the processor is configured to calculate a weighted average when using the pixel of the second search area for calculating the average of the first target pixel.

19. The video camera of claim 18,
wherein the processor is configured, for the second image frame, to give greater weight to pixels closer to the second target pixel, or
wherein the first pixel patch and the second pixel patch each include a central pixel and surrounding neighboring pixels.

20. The video camera of claim 15,
wherein the second image frame comprises a weighted average of a stack of image frames calculated using the processor according to claim 15, or
wherein the second image frame comprises an image frame preceding the first image frame and output from the processor.

* * * * *